(12) United States Patent
Al-Haj Ali et al.

(10) Patent No.: US 10,604,595 B2
(45) Date of Patent: Mar. 31, 2020

(54) PROCESS FOR WITHDRAWING POLYOLEFINS

(71) Applicant: Borealis AG, Vienna (AT)

(72) Inventors: Mohammad Al-Haj Ali, Helsinki (FI); Erik Eriksson, Stenungsund (SE); Sameer Vijay, Linz (AT); Guhan Mathivanan, Linz (AT); Jukka Rasanen, Porvoo (FI); Henry Sleijster, Echt (NL); Christof Wurnitsch, Neufelden (AT); Samuli Zitting, Tuusula (FI)

(73) Assignee: BOREALIS AG, Vienna (AT)

( * ) Notice: Subject to any disclaimer, the term of this patent is extended or adjusted under 35 U.S.C. 154(b) by 26 days.

(21) Appl. No.: 15/776,089

(22) PCT Filed: Dec. 21, 2016

(86) PCT No.: PCT/EP2016/082113
§ 371 (c)(1),
(2) Date: May 15, 2018

(87) PCT Pub. No.: WO2017/108909
PCT Pub. Date: Jun. 29, 2017

(65) Prior Publication Data
US 2018/0327522 A1 Nov. 15, 2018

(30) Foreign Application Priority Data

Dec. 21, 2015 (EP) .................... 15003631

(51) Int. Cl.
*C08F 6/12* (2006.01)
*C08F 6/00* (2006.01)
*B01J 8/00* (2006.01)
*C08L 23/02* (2006.01)

(52) U.S. Cl.
CPC ........... *C08F 6/12* (2013.01); *B01J 8/0015* (2013.01); *C08F 6/003* (2013.01); *C08L 23/02* (2013.01)

(58) Field of Classification Search
USPC ........................................ 528/501
See application file for complete search history.

(56) References Cited

U.S. PATENT DOCUMENTS 8,916,659 B1 12/2014 Costin et al.

FOREIGN PATENT DOCUMENTS

| WO | WO 2002/034795 A1 | 5/2002 |
| WO | WO 2011/087728 A2 | 7/2011 |

OTHER PUBLICATIONS

International Search Report dated Mar. 28, 2017 from PCT/EP2016/082113.

*Primary Examiner* — Terressa Boykin
(74) *Attorney, Agent, or Firm* — Fay Sharpe LLP (57) ABSTRACT

A process for withdrawing polyolefins from a reactor includes: continuously withdrawing a liquid solution stream from a solution polymerization reactor and passing the liquid solution stream into a low pressure separator; withdrawing a first vapour stream and a first liquid stream from the separator and passing the first vapour stream into a washing column; withdrawing a second vapour stream from the washing column and feeding it via a condenser line to a condenser; cooling the second vapour stream in the condenser so that part of the second vapour stream condenses, producing a condensed second vapour stream and an uncondensed second vapour stream; passing the condensed second vapour stream to an upper part of the washing column via a reflux line; withdrawing a second liquid stream from the washing column and passing at least part of the second liquid stream to the separator via a recycling line; and recovering heat.

16 Claims, 3 Drawing Sheets

PROCESS FOR WITHDRAWING POLYOLEFINS

This is a 371 of PCT Patent Application Serial No. PCT/EP2016/082113 filed Dec. 21, 2016, which claims priority to European Patent Application Serial No. 15003631.7 filed Dec. 21, 2015, the entire contents of which are incorporated herein by reference.

The present invention is concerned with a process for withdrawing polyolefins from a solution polymerization reactor using downstream treatment for reducing entrainment of polyolefins.

BACKGROUND

WO-A-2008082511 discloses a process where two or more polymerization reactors feed one high-pressure separator. The pressure in the high-pressure separator can be up to 25 MPa. WO-A-2008109094 discloses a process for recovering volatile components from polymer solution. The liquid-liquid separation process (LOST phase separation) returns the volatile components to the polymerization reactors optionally via one or more separation towers. U.S. Pat. No. 2,691,674 discloses a solution polymerization process with two-step recovery of volatile hydrocarbons from the polymer solution.

WO-A-2011087728, U.S. Pat. No. 8,916,659 B1 and WO-A-0234795 all disclose processes in which the solution of one or more solution polymerization reactors is separated in a liquid-liquid high pressure separator. In a further downstream separation stage the polymer-enriched liquid stream is fed into a vapour-liquid low pressure separator in which remaining volatile compounds are separated from the polymer-enriched liquid stream. The vapour stream containing the volatile compounds is then passed to a purification tower which essentially is a distillation column for separating the highly volatile compounds from the heavier less volatile compounds of the vapour stream.

There is still the need for an efficient process for withdrawing polyolefins from a solution polymerization reactor.

SUMMARY

For the separation of polyolefins from solution polymerization several techniques can be used. In the simplest configuration the withdrawal of the polyolefins is batchwise. However, such batchwise withdrawal is time consuming and may constitute the production rate determining step in industrial solution polymerization. The shortfalls of this can be overcome by a continuous withdrawal process, whereby the reactor outlet polyethylene concentration is enriched via two-stage vapour-liquid separation. The vapour-liquid separation takes place in low pressure separators: the solvent(s) and monomer(s) are collected into the overhead, whereas the polyolefin is enrichened in the bottom stream. However, due to carry-over, part of the polyolefin is entrained in the overhead gases of the low pressure separators. This results in severe problems in the process. Entrainment of polyolefins in a first low pressure separator creates fouling in heat exchangers and influences production capacity even if additional cleaning actions are foreseen. Entrainment of polyolefins in the second low pressure separator overhead can give the same problems and limit the recovery of materials.

The present invention is based on the finding that a twofold circulation namely in the bottom/middle part of the washing column and the upper/top part of the washing column allows a setup which reduces fouling effects of polyolefins at the heat exchangers.

The present invention insofar provides
a process for withdrawing polyolefins from a solution polymerization reactor comprising:
(a) providing
   a low pressure separator 1,
   a washing column 2,
   a withdrawal line 3 connecting the upper part of the low pressure separator and the washing column
   a condenser 4,
   a condenser-line 5 connecting the top part of the washing column and the condenser
   optionally a recycle solvent vessel 6
   optionally a solvent-vessel-line 7 connecting the condenser with the recycle solvent vessel
   a reflux line 8 connecting the condenser and the upper part of the washing column or connecting the recycle solvent vessel and the upper part of the washing column
   optionally a circulation line 9 fluidly connected to the middle part of the washing column and recycling line 10
   a recycling line 10 connecting the bottom of the washing column and the upper part of the low pressure separator,
   optionally a wash recycle heater 11 embedded into the recycling line 10
   optionally a heater 12 embedded into the circulation line 9
(b) continuously withdrawing a liquid solution stream from the solution polymerization reactor and passing said liquid solution stream into the first low pressure separator 1;
(c) withdrawing a first vapour stream and a first liquid stream from the low pressure separator and passing said first vapour stream via withdrawal line 3 into the washing column
(d) withdrawing a second vapour stream from the washing column and feeding it via condenser line 5 to condenser 4
(e) cooling the second vapour stream in condenser 4 so that a part of the second vapour stream condenses thereby producing a condensed second vapour stream and an uncondensed second vapour stream
(f) passing the condensed second vapour stream to the upper part of the washing column via reflux line 8
(g) withdrawing a second liquid stream from the washing column and passing at least a part of the second liquid stream to the low pressure separator via recycling line 10
(h) recovering heat from the condenser The present invention further provides
a process for double stage withdrawing polyolefins from a solution polymerization reactor comprising:
(a) providing
   a first low pressure separator 1,
   a first washing column 2,
   a first withdrawal line 3 connecting the upper part of the first low pressure separator and the first washing column
   a first condenser 4,
   a first condenser-line 5 connecting the top part of the first washing column and the first condenser
   optionally a first recycle solvent vessel 6
   optionally a first solvent-vessel-line 7 connecting the first condenser with the first recycle solvent vessel a first reflux line 8 connecting the first condenser and the upper part of the first washing column or connecting the first recycle solvent vessel and the upper part of the first washing column optionally a first circulation line 9 fluidly connected to recycling line 10 and the middle part of the washing column a first recycling line 10 connecting the bottom of the washing column and the upper part of the first low pressure separator, optionally a first wash recycle heater 11 embedded into the recycling line 10 optionally a first heater 12 embedded into the circulation line 9 further providing a second low pressure separator 15, a second washing column 16, a second withdrawal line 17 connecting the upper part of the second low pressure separator and the second washing column a second condenser 18, a second condenser-line 19 connecting the upper part of the second washing column and the second condenser optionally a second recycle solvent vessel 20 optionally a second solvent-vessel-line 21 connecting the second condenser with the second recycle solvent vessel a second reflux line 22 connecting the second condenser and the upper part of the second washing column or connecting the second recycle solvent vessel and the upper part of the second washing column optionally a second circulation line 23 fluidly connected to connecting line 24 and the middle part of the second washing column a connecting line 24 connecting the bottom of the second washing column and the first recycling line 10 or low pressure separator 1 optionally a second heater 25 embedded into the second circulation line 23

(b) continuously withdrawing a liquid solution stream from the solution polymerization reactor and passing said liquid solution stream into the first low pressure separator 1; further passing a second liquid solution stream into the second low pressure separator 15;

(c) withdrawing a first vapour stream A and a first liquid stream A from the first low pressure separator 1 and passing said first vapour stream A via the first withdrawal line 3 into the first washing column 2; further withdrawing a first vapour stream B and a first liquid stream B from the second low pressure separator 15 and passing said first vapour stream B via the second withdrawal line 17 into the second washing column 16

(d) withdrawing a second vapour stream C from the first washing column 2 and feeding it via the first condenser line 5 to the first condenser 4; further withdrawing a second vapour stream D from the second washing column 16 and feeding it via the second condenser line 19 to the second condenser 18

(e) cooling the second vapour stream C so that a part of the second vapour stream C condenses thereby producing a condensed second vapour stream C and an uncondensed second vapour stream C; further cooling the second vapour stream D so that a part of the second vapour stream D condenses thereby producing a condensed second vapour stream D and an uncondensed second vapour stream D;

(f) passing the condensed vapour stream C to the upper part of the first washing column 2 via reflux line 8; further passing the condensed vapour stream D to the upper part of the second washing column 16 via reflux line 22

(g) withdrawing a second liquid stream E from the first washing column 2 and passing at least a part of said second liquid stream E to the first low pressure separator via recycling line 10;

(h) withdrawing a second liquid stream F from the second washing column 16 and feeding said second liquid stream F at least partially back to the first low pressure separator 1 via connecting line 24.

Low pressure separators are known in the prior art for decades. Frequently they are also referred to as flash separators. As it is well known in the art the liquid feed is passed to a vessel operated at a reduced pressure. Thereby a part of the liquid phase vaporizes and can be withdrawn as an overhead stream (or a vapour stream) from the low pressure separator. The part remaining in liquid phase is then withdrawn as a bottom stream or a liquid stream. Operating the low pressure separator under conditions such that both vapor and liquid phases are present in the separator describes this situation.

Washing columns are known per se. The removal of undesired impurities from solids, preferably introduced and removed as a slurry, is effected by counter-current flow of the solids and a mixture for washing introduced into a washing zone. Control of temperature and streams increases efficiency of the washing.

The withdrawal line 3 connecting to the upper part of the low pressure separator shall mean that the withdrawal line connects above the middle of the low pressure separator with respect to the total outer height. Usually the connection will be right at the top of the low pressure separator.

The condenser-line 5 connecting the top part of the washing column and the condenser shall mean a connection starting at the top, i.e. at least above ⅘ of the total height of the washing column. Usually the connection will be right at the top of the washing column.

The circulation line 9 is fluidly connected to recycling line 10 and the middle part of the washing column. Middle part means that the connection is at a height of above ⅔ and below ⅘ of the total height of the washing column.

The recycling line 10 connects the bottom of the washing column and the upper part of the low pressure separator. Upper part of the low pressure separator again means a connection above the middle of the low pressure separator with respect to the total outer height. Bottom of the washing column equals a height of below ⅕ of the total height of the washing column.

Withdrawing a vapour phase stream from the low pressure separator has to be understood with respect to the feed of the low pressure separator. In the low pressure separator the mixture of polymer, monomer residual and solvent is subjected to separation, i.e. separating the monomers from the polymers. The vapour stream includes mainly solvent, monomer and optionally comonomer(s). A skilled person will understand that the vapour stream may contain very minor amounts by volume of liquid.

A circulation of monomers and polymer residues is effectuated within the circulation line 9 by withdrawing a liquid stream from the bottom of the washing column, heating said liquid stream at least partially in the heater 12 and feeding said liquid stream at least partially back to the middle part of the washing column. Again a skilled person will understand that the liquid stream may contain very minor amount of vapour such as in the form of bubbles.

DETAILED DESCRIPTION

The process according to the present invention shall be explained in the following in more detail.

A liquid stream containing the polymerization solution including unreacted monomer and optionally unreacted comonomer, solvent and polymer is passed into the low pressure separator in which due to pressure reduction the solution is separated in a vapour stream and a liquid stream. The vapour stream mainly comprises unreacted monomer and optionally unreacted comonomer and solvent which under the conditions in the low pressure separator are vapourized and minor amounts of liquid droplets and polymer particles which are entrained in the vapour stream. The liquid stream mainly comprises polymer and non-vapourized solvent and minor amounts of unreacted monomer and optionally comonomer in form of bubbles which are entrained in the liquid stream.

The vapour stream is withdrawn from the low pressure separator and feed via withdrawal line 3 into the washing column. The washing column is used to wash the polymer, which is usually present in the form of droplets, from the vapour stream. As washing medium a condensate of the washed vapour stream, which preferably mainly consists of solvent, is used. The polymer and optionally traces of monomers are thereby withdrawn from the washing column in a liquid stream from the bottom of the washing column through a recycle line 10. Moreover, optionally and preferably a circulation of monomers and polymer residues is effectuated by optionally and preferably heating at least part of said liquid stream at least partially in the heater 12 and feeding said liquid stream at least partially back to the middle part of the washing column.

From the recycling line 10 the liquid stream is withdrawn, heated in wash recycle heater 11 and fed into the low pressure separator. As a consequence of said circulation polymer which is entrained in the vapour stream withdrawn from the low pressure separator is washed out of the vapour stream in the washing column and returned to the low pressure separator through the recycle line.

At the top part of the washing column a vapour stream is withdrawn and fed via condenser-line 5 to condenser 4. The vapour stream is partially condensed in the condenser 4. The heat is transferred to water, whereby steam is obtained. The steam is either used directly or transferred via a steam drum. In the condenser 4 a condensed vapour stream and an uncondensed vapour stream are obtained. Thereby, the condensed vapour stream mainly contains the components with a lower boiling temperature such as e.g. the solvent whereas the uncondensed vapour stream mainly contains the components with a higher boiling temperature such as e.g. the unreacted monomer and optionally unreacted comonomer.

The at least partially condensed material leaving the condenser 4 via line 7 is optionally collected in the recycle solvent vessel 6. For further heat recovery the gaseous part of the mixture is again sent to a further condenser 13 via the condenser circulation line 14. The mixture is cooled by cooling medium in the further condenser. The cooling medium is usually cooling water. The separated gas which preferably mainly consists of monomer and optionally comonomer is recycled back to a tank for the reactants, frequently denoted feed tank.

The fully condensed material from the condenser, which preferably mainly consists of solvent, is then fed via reflux line 8 to the upper part of the washing column. The reflux line 8 is usually equipped with a pump. Usually the condensed material fed via reflux line 8 to the washing column has a lower temperature than the material fed via line 9 to the washing column. As reflux line 8 enters the washing column above line 9 with respect to the height of the washing column, a temperature gradient will be present. This gradient contributes to the separation in the washing column.

In a preferred aspect the whole second liquid stream is passed to the first low pressure separator.

In an alternative and also preferred aspect, a part of the second liquid stream is passed to the first low pressure separator and the remaining part of the second liquid stream is passed to the washing column via circulation line 9. It is further preferred in this embodiment that the remaining part of the second liquid stream which is passed to the washing column is at least partially heated by heater 12.

Moreover, according to the present invention the second liquid stream passed to the first low pressure separator is preferably heated by wash recycle heater 11.

In a preferred embodiment, the present invention is concerned with a two-stage process for withdrawing polyolefins as outlined above.

The process is carried out as described above for the one-stage separation but contains additional process steps. All preferred process steps as outlined above with respect to the one-stage separation shall also apply for the two-stage separation. The same holds for all preferred embodiments. These shall also apply for the two-stage process as far as applicable.

In the two-stage separation a liquid stream containing the polymerization solution including unreacted monomer and optionally unreacted comonomer, solvent and polymer is passed into a second low pressure separator 15 in which due to pressure reduction the solution is separated in a vapour stream and a liquid stream. The vapour stream mainly comprises unreacted monomer and optionally unreacted comonomer and solvent which under the conditions in the low pressure separator are vapourized and minor amounts of polymer in form of liquid droplets and polymer particles which are entrained in the vapour stream. The liquid stream mainly comprises polymer and non-vapourized solvent and minor amounts of unreacted monomer and optionally comonomer in form of bubbles which are entrained in the liquid stream. Preferably, the liquid stream passed into the second low pressure separator 15 is the polymer-enriched liquid stream withdrawn from the first low pressure separator 1.

The vapour phase (i.e. second vapour stream C) is withdrawn from the second low pressure separator 15 and fed via a second withdrawal line 17 into the second washing column 16. The washing column is used to wash the polymer, which is usually present in the form of droplets, from the vapour stream. As washing medium a condensate of the washed vapour stream, which preferably mainly consists of solvent, is used. The polymer and optionally traces of monomers are thereby withdrawn from the washing column in a liquid stream (i.e. second liquid stream F) from the bottom of the washing column through a connecting line 24. Optionally and preferably a circulation of monomers and polymer residues is effected within the second circulation line 23 and connecting line 24 by optionally and preferably heating said polymer residue enriched stream at least partially in the second heater 25 and feeding said polymer residue enriched stream at least partially back to the middle part of the second washing column. The second polymer residue enriched stream (i.e. second liquid stream F) is at least partially passed to the first low pressure separator 1. As a consequence of said circulation polymer which is entrained in the vapour stream withdrawn from the second low pressure separator 15 is washed out of the vapour stream in the washing column 16 and fed to the first low pressure separator 1 through the connecting line 24.

The inventive process further involves withdrawing a polymer lean stream (i.e. second vapour stream D) from the top part of the second washing column via the second condenser-line 19 to the second condenser 18 and recovering heat from the second condenser. In the second condenser 18 a condensed vapour stream and an uncondensed vapour stream are obtained. Thereby, the condensed vapour stream mainly contains the components with a lower boiling temperature such as e.g. the solvent whereas the uncondensed vapour stream mainly contains the components with a higher boiling temperature such as e.g. the unreacted monomer and optionally unreacted comonomer. The condensed material (i.e. condensed second vapour stream D) from the second condenser is fed back via the second reflux line 22 to the upper part of the second washing column. The second stage of the process is insofar equivalent with the first stage.

The two stages are however coupled via the connecting line 24. This line 24 connects the bottom of the second washing column with the first recycling line 10 or connects the bottom of the second washing column with the first low pressure separator. This enables withdrawing the second polymer residue enriched stream (i.e. second liquid stream F) from the second washing column and feeding said second polymer residue enriched stream (i.e. second liquid stream F) at least partially via line 24 to the first low pressure separator.

It has been surprisingly found that this coupling allows highest flexibility of the process.

In the following further preferred aspects are described with respect to the two stage process.

In a first embodiment the whole second liquid stream E is passed to the first low pressure separator. In a second embodiments, only a part of the second liquid stream E is passed to the first low pressure separator and the remaining part of the second liquid stream E is passed to the first washing column via circulation line 9. If this is done, it is preferred that the remaining part of the second liquid stream E which is passed to the washing column is at least partially heated by heater 12. Further preferably, the second liquid stream E passed to the first low pressure separator is heated by wash recycle heater 11.

In a further embodiment of the present invention the whole of second liquid stream F is passed to the first low pressure separator. In yet another embodiment of the present invention only a part of the second liquid stream F is passed to the first low pressure separator and the remaining part of the second liquid stream F is passed to the second washing column via circulation line 23. If this is done, it is preferred that the remaining part of the second liquid stream F which is passed to the second washing column is at least partially heated by heater 25.

The following aspects equally apply for the one stage process and the two stage process. In a first aspect the process further includes providing at least one condenser circulation line 14; and embedded therein a further condenser 13, the condenser circulation line 14 being connected with the recycling solvent vessel 6 or the recycle solvent vessel 20.

In a second aspect the process further includes the step of sending back uncondensed material having passed condenser 4 and/or condenser 18 back to the polymerization reactor(s) via a feed tank. This step can be included for the one stage process as well as for the two stage process. For the later there is the option that such step is foreseen for the material having passed condenser 4 or the step is foreseen for the material having passed condenser 18. Alternatively the sending back may be implemented for both.

The inventive processes, i.e. both the one stage and the two stage process are particularly suitable for treatment of material which originates from a polymerization in homogenous phase comprising the monomer and the polymer.

The temperature in the low pressure separator(s) is suitably within the range of 120 to 240° C., preferably from 140 to 220° C. and more preferably from 150 to 200° C.

The pressure in the low pressure separator(s) is reduced to 1 to 15 bar, preferably from 2 to 12 bar and more preferably from 5 to 10 bar. The pressure is preferably reduced so that it is at least from about 40 bar to about 295 bar lower than the pressure in the polymerization reactor.

In one embodiment the temperature in the low second pressure separator 15 is suitably within the range of 190 to 260° C., preferably from 200 to 250° C. and more preferably from 210 to 230° C.

In said embodiment pressure in the second low pressure separator 15 is reduced to 0.5 to 10 bar, preferably from 0.8 to 5 bar and more preferably from 0.9 to 2 bar.

In a preferred embodiment the low pressure separation step is a flashing step. The flashing step is suitably conducted in a flash vessel which is a vertical vessel preferably having a generally cylindrical shape. Thereby the flash vessel has a section which has approximately a circular cross-section. Preferably the flash vessel has a cylindrical section which has a shape of a circular cylinder. In addition to the cylindrical section the flash vessel may have additional sections, such as a bottom section, which may be conical, and a top section which may be hemispherical. Alternatively, the vessel for the low pressure separation step may also have a generally conical shape.

The temperature in the low pressure separation is typically from 130 to 300° C. The temperature should be sufficiently high to keep the viscosity of the solution at a suitable level but less than the temperature where the polymer is degraded. The pressure in the low pressure separation is typically from 15 bar to 1 bar. Lower pressures than atmospheric are also possible but usually not preferred.

The solution stream enters the low pressure separator at the top. The solution travels downwards in the low pressure separator while the gases which evaporate from the solution travel upwards. According to this preferred embodiment the polymer solution forms a thin film which falls downwards in the low pressure separator. This facilitates the removal of hydrocarbons from the polymer solution. The gases are typically withdrawn from the top of the low pressure separator while the solution is withdrawn from the bottom.

According to an especially preferred embodiment the solution from the reactor is sprayed in the low pressure separator. The spraying can be done by using one or more suitable nozzles which disperse the solution stream into droplets. Such nozzles are well known in the industry and include air atomizing nozzles, flat fan nozzles, hollow cone nozzles and full cone nozzles. Preferably the nozzles break the stream into droplets having the size of not more than about 1 mm.

The nozzle forms a stream of droplets in the low pressure separator. The stream of droplets then coagulates within the low pressure separator and forms a falling film having a relatively high surface area. This enhances the mass transfer of the volatile components from the solution.

As described above the low pressure separator can have a vertical generally cylindrical shape. Then the stream of droplets is directed tangentially with the wall of the low pressure separator by a suitable position of the nozzle. Thus, the nozzle is suitably located relatively near to the wall so that its outlet is directed tangentially with the wall. When the stream of the droplets exits the nozzle it moves in the direction of the wall forming a downwards falling film. It is also possible that the low pressure separator has a vertical generally conical shape. In such embodiment it is possible to direct the stream of the droplets tangentially with the wall of the low pressure separator, as described above. However, it is also possible direct the droplets axially towards the wall of the low pressure separator. The nozzle or the nozzles are then arranged eccentrically within the low pressure separator. In both arrangements the polymer solution forms a falling film within the low pressure separator.

The polymer content in solution stream withdrawn from the low pressure separator(s) is typically from 40 to 90% by weight, preferably from 50 to 80% by weight, most preferably from 60 to 75% by weight, based on the total weight content of the solution stream. In other words, the product stream withdrawn from the low pressure separator(s) contains from 10 to 60% by weight, preferably from 20 to 50% by weight, most preferably from 25 to 40% by weight of residual hydrocarbons, based on the total weight content of the solution stream.

When viewed from a different angle, the hydrocarbon stream withdrawn from the low pressure separator is from 35 to 80% by weight from the total material streams withdrawn from the low pressure separator. The hydrocarbon stream typically comprises unreacted monomer and also solvent and unreacted comonomer.

In the above described embodiment in which for the second low pressure separator 15 a higher temperature range and a lower pressure range is used the polymer content in the solution stream withdrawn from second low pressure separator 15 is typically from 80 to 100% by weight, preferably from 95 to 99.5% by weight, most preferably from 98 to 99% by weight, based on the total weight content of the solution stream. In other words, the product stream withdrawn from the second low pressure separator 15 contains from 0 to 20% by weight, preferably from 0.5 to 5% by weight, most preferably from 1 to 2% by weight of residual hydrocarbons, based on the total weight content of the solution stream.

The invention is further described with respect to the figures in the following.

REFERENCE SIGNS LIST (1) first low pressure separator
(2) first washing column
(3) first withdrawal line connecting the upper part of the first low pressure separator and the first washing column
(4) first condenser
(5) first condenser-line connecting the top part of the first washing column and the first condenser
(6) optional first recycle solvent vessel
(7) optional first solvent-vessel-line connecting the first condenser with the first recycle solvent vessel
(8) first reflux line connecting the first condenser and the upper part of the first washing column or connecting the first recycle solvent vessel and the upper part of the first washing column
(9) first circulation line fluidly connected to the first recycling line 10 and the middle part of the washing column
(10) first recycling line connecting the bottom of the first washing column and the upper part of the first low pressure separator
(11) optional first wash recycle heater embedded into the recycling line 10
(12) optional first heater embedded into the circulation line 9
(13) optional second condenser
(14) optional condenser circulation line being connected with the recycling solvent vessel 6 or the recycle solvent vessel 20
(15) second low pressure separator
(16) second washing column
(17) second withdrawal line connecting the upper part of the second low pressure separator and the second washing column
(18) second condenser
(19) second condenser-line connecting the upper part of the second washing column and the second condenser
(20) optional second recycle solvent vessel
(21) optional second solvent-vessel-line connecting the second condenser with the second recycle solvent vessel
(22) second reflux line connecting the condenser and the upper part of the second washing column or connecting the second recycle solvent vessel and the upper part of the second washing column
(23) second circulation line fluidly connected to connecting line 24 and the middle part of the washing column
(24) connecting line connecting the bottom of the second washing column and the first recycling line 10 or the first low pressure separator 1
(25) optional second heater 25 embedded into the second circulation line 23

The figures shall be described in more detail in the following.

Figure 1:
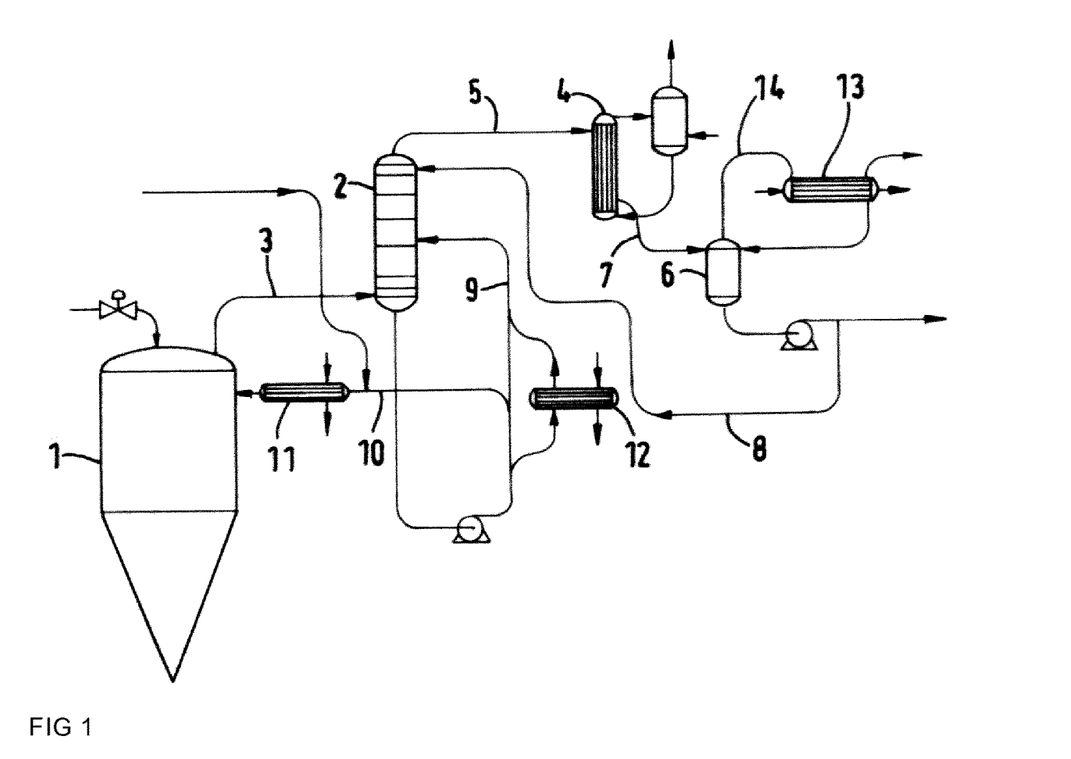
FIG. 1 shows the inventive process for withdrawing polyolefins from a solution polymerization reactor.

FIG. 1 shows the process for withdrawing polyolefins from a solution polymerization reactor according to the present invention. In the configuration for the inventive process a low pressure separator 1, a washing column 2, a withdrawal line 3 connecting the upper part of the low pressure separator and the washing column, a condenser 4, a condenser-line 5 connecting the top part of the washing column and the condenser, a recycle solvent vessel 6, a solvent-vessel-line 7 connecting the condenser with the recycle solvent vessel, a reflux line 8 connecting the recycle solvent vessel and the upper part of the washing column, a circulation line 9 fluidly connected to cycling line 10 and the middle part of the washing column, a recycling line 10 connecting to the bottom of the first washing column and the upper part of the low pressure separator, a wash recycle heater 11 embedded into the recycling line 10, a heater 12 embedded into the circulation line 9 are used.

The process involves operating the low pressure separator under conditions such that both vapor and liquid phases are present on the downstream side. A polymer-lean phase is withdrawn from the low pressure separator and fed via withdrawal line 3 into washing column 2.

A circulation of monomers and polymer residues within the circulation line 9 is ensured by standard means, i.e. by withdrawing a polymer residue enriched stream from the bottom of the washing column, heating said polymer residue enriched stream at least partially in the heater 12 and feeding said polymer residue enriched stream at least partially back to the middle part of the washing column.

Moreover a polymer residue enriched stream is withdrawn via line 10, heated in the wash recycle heater 11 and fed into the low pressure separator.

A polymer lean stream from the top part of the washing column is withdrawn and sent via condenser-line 5 to the condenser 4. In condenser 4 heat is recovered.

The condensed material from condenser 4 is fed via reflux line 8 and included first recycle solvent vessel 6 to the upper part of the washing column.

Figure 2:
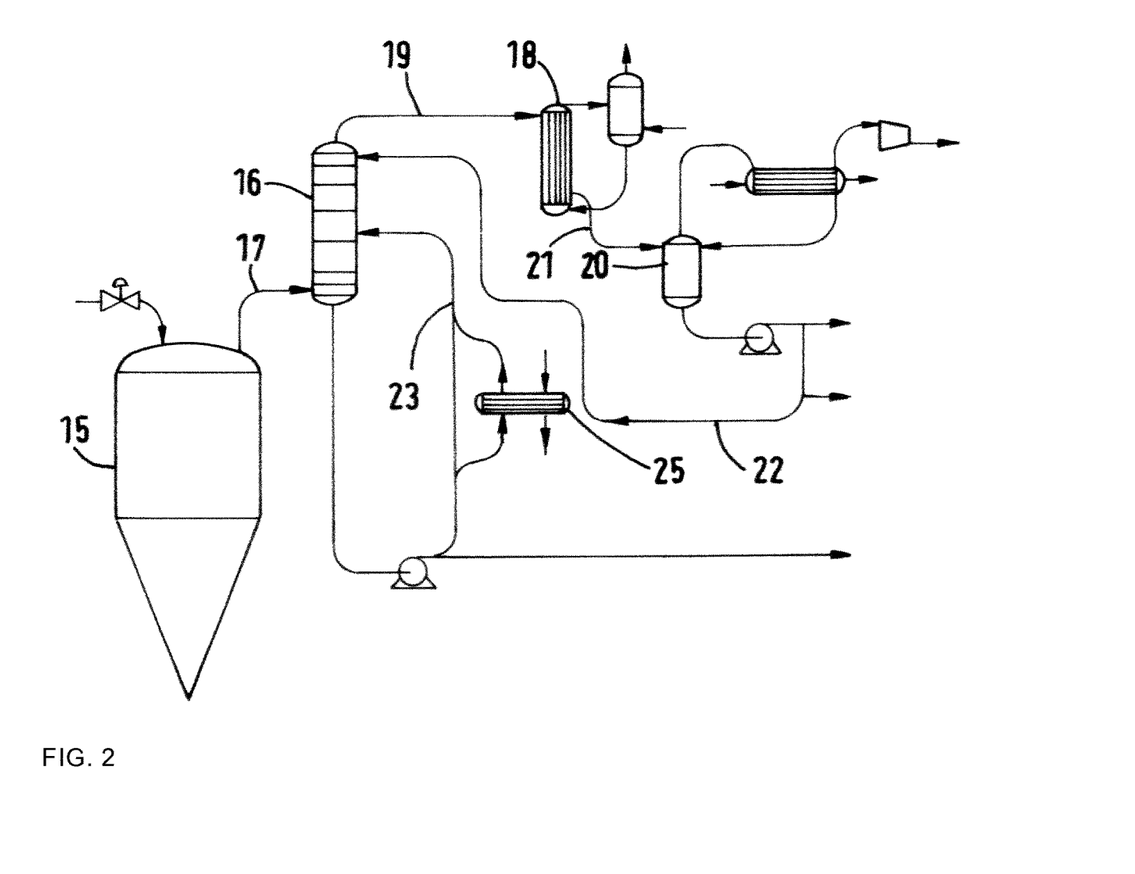
FIG. 2 shows the further parts of a double stage process for withdrawing polyolefins from a solution polymerization reactor.

FIG. 2 is essentially equivalent with FIG. 1. However, as can be seen a further line for connecting the two purification stages is foreseen due to connecting line 24.

Figure 3:
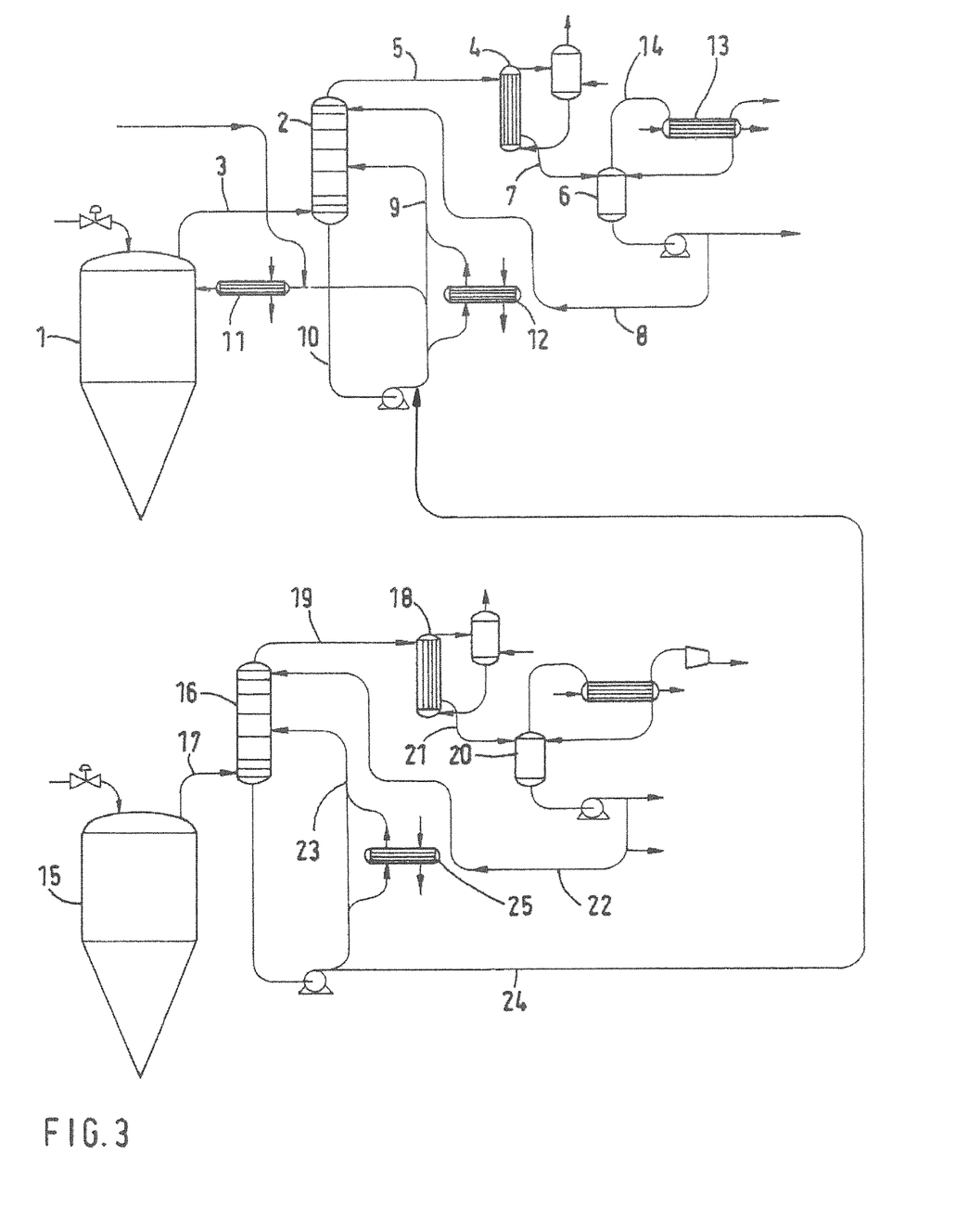
FIG. 3 shows a double stage process for withdrawing polyolefins from a solution polymerization reactor.

The total configuration is shown in FIG. 3.

The invention claimed is:

1. A process for withdrawing polyolefins from a solution polymerization reactor comprising:
   (a) providing
      a low pressure separator 1,
      a washing column 2,
      a withdrawal line 3 connecting the upper part of the low pressure separator and the washing column
      a condenser 4,
      a condenser-line 5 connecting the top part of the washing column and the condenser
      optionally a recycle solvent vessel 6
      optionally a solvent-vessel-line 7 connecting the condenser with the recycle solvent vessel
      a reflux line 8 connecting the condenser and the upper part of the washing column or connecting the recycle solvent vessel and the upper part of the washing column
      optionally a circulation line 9 fluidly connected to the middle part of the washing column and recycling line 10
      a recycling line 10 connecting the bottom of the washing column and the upper part of the low pressure separator,
      optionally a wash recycle heater 11 embedded into the recycling line 10
      optionally a heater 12 embedded into the circulation line 9
   (b) continuously withdrawing a liquid solution stream from the solution polymerization reactor and passing said liquid solution stream into the first low pressure separator 1;
   (c) withdrawing a first vapour stream and a first liquid stream from the low pressure separator and passing said first vapour stream via withdrawal line 3 into the washing column
   (d) withdrawing a second vapour stream from the washing column and feeding it via condenser line 5 to condenser 4
   (e) cooling the second vapour stream in condenser 4 so that a part of the second vapour stream condenses thereby producing a condensed second vapour stream and an uncondensed second vapour stream
   (f) passing the condensed second vapour stream to the upper part of the washing column via reflux line 8
   (g) withdrawing a second liquid stream from the washing column and passing at least a part of the second liquid stream to the low pressure separator via recycling line 10
   (h) recovering heat from the condenser.

2. The process of claim 1, whereby the whole second liquid stream is passed to the low pressure separator.

3. The process of claim 1, whereby a part of the second liquid stream is passed to the low pressure separator and the remaining part of the second liquid stream is passed to the washing column via circulation line 9.

4. The process of claim 3, whereby the remaining part of the second liquid stream which is passed to the washing column is at least partially heated by heater 12.

5. The process according to claim 1, whereby the second liquid stream passed to the low pressure separator is heated by wash recycle heater 11.

6. A process for double stage withdrawing polyolefins from a solution polymerization reactor comprising:
   (a) providing
      a first low pressure separator 1,
      a first washing column 2,
      a first withdrawal line 3 connecting the upper part of the first low pressure separator and the first washing column
      a first condenser 4,
      a first condenser-line 5 connecting the top part of the first washing column and the first condenser
      optionally a first recycle solvent vessel 6
      optionally a first solvent-vessel-line 7 connecting the first condenser with the first recycle solvent vessel
      a first reflux line 8 connecting the first condenser and the upper part of the first washing column or connecting the first recycle solvent vessel and the upper part of the first washing column
      optionally a first circulation line 9 fluidly connected to recycling line 10 and the middle part of the washing column
      a first recycling line 10 connecting the bottom of the washing column and the upper part of the first low pressure separator,
      optionally a first wash recycle heater 11 embedded into the recycling line 10
      optionally a first heater 12 embedded into the circulation line 9
      further providing
      a second low pressure separator 15,
      a second washing column 16,
      a second withdrawal line 17 connecting the upper part of the second low pressure separator and the second washing column
      a second condenser 18,
      a second condenser-line 19 connecting the upper part of the second washing column and the second condenser
      optionally a second recycle solvent vessel 20
      optionally a second solvent-vessel-line 21 connecting the second condenser with the second recycle solvent vessel
      a second reflux line 22 connecting the second condenser and the upper part of the second washing column or connecting the second recycle solvent vessel and the upper part of the second washing column optionally a second circulation line 23 fluidly connected to connecting line 24 and the middle part of the second washing column a connecting line 24 connecting the bottom of the second washing column and the first recycling line 10 or low pressure separator 1 optionally a second heater 25 embedded into the second circulation line 23

(b) continuously withdrawing a liquid solution stream from the solution polymerization reactor and passing said liquid solution stream into the first low pressure separator 1; further passing a second liquid solution stream into the second low pressure separator 15;

(c) withdrawing a first vapour stream A and a first liquid stream A from the first low pressure separator 1 and passing said first vapour stream A via the first withdrawal line 3 into the first washing column 2; further withdrawing a first vapour stream B and a first liquid stream B from the second low pressure separator 15 and passing said first vapour stream B via the second withdrawal line 17 into the second washing column 16

(d) withdrawing a second vapour stream C from the first washing column 2 and feeding it via the first condenser line 5 to the first condenser 4; further withdrawing a second vapour stream D from the second washing column 16 and feeding it via the second condenser line 19 to the second condenser 18

(e) cooling the second vapour stream C so that a part of the second vapour stream C condenses thereby producing a condensed second vapour stream C and an uncondensed second vapour stream C; further cooling the second vapour stream D so that a part of the second vapour stream D condenses thereby producing a condensed second vapour stream D and an uncondensed second vapour stream D;

(f) passing the condensed vapour stream C to the upper part of the first washing column 2 via reflux line 8; further passing the condensed vapour stream D to the upper part of the second washing column 16 via reflux line 22

(g) withdrawing a second liquid stream E from the first washing column 2 and passing at least a part of said second liquid stream E to the first low pressure separator via recycling line 10;

(h) withdrawing a second liquid stream F from the second washing column 16 and feeding said second liquid stream F at least partially back to the first low pressure separator 1 via connecting line 24.

7. The process of claim 6, whereby the whole second liquid stream E is passed to the first low pressure separator.

8. The process of claim 6, whereby a part of the second liquid stream E is passed to the first low pressure separator and the remaining part of the second liquid stream E is passed to the first washing column via circulation line 9.

9. The process of claim 8, whereby the remaining part of the second liquid stream E which is passed to the washing column is at least partially heated by heater 12.

10. The process according to claim 6, whereby the second liquid stream E passed to the first low pressure separator is heated by wash recycle heater 11.

11. The process according to claim 6, whereby the whole of second liquid stream F is passed to the first low pressure separator.

12. The process according to claim 6, whereby a part of the second liquid stream F is passed to the first low pressure separator and the remaining part of the second liquid stream F is passed to the second washing column via circulation line 23.

13. The process of claim 12, whereby the remaining part of the second liquid stream F which is passed to the second washing column is at least partially heated by heater 25.

14. The process of claim 6, whereby the first liquid stream A from the first low pressure separator 1 is passed into the second low pressure separator 15 as second liquid solution stream.

15. The process according to claim 1, which process further includes providing
    at least one condenser circulation line 14; and
    embedded therein a further condenser 13, the condenser circulation line 14 being connected with the recycling solvent vessel 6 or the recycle solvent vessel 20.

16. The process of claim 1, wherein uncondensed material having passed condenser 4 and/or condenser 18 is send back to the polymerization reactor(s) via a feed tank.

* * * * *